United States Patent [19]

Lucius

[11] Patent Number: 5,695,093

[45] Date of Patent: Dec. 9, 1997

[54] CONTROLLED DOSE DISPENSING CONTAINER HAVING A DISPENSING RECEPTACLE FOR DISPENSING FLUIDS

[75] Inventor: Thomas A. Lucius, Toledo, Ohio

[73] Assignee: T L Design Service Inc., Sylvania, Ohio

[21] Appl. No.: 526,866

[22] Filed: Sep. 12, 1995

[51] Int. Cl.$^6$ ........................................... B67D 5/56
[52] U.S. Cl. ............................... 222/129; 222/454
[58] Field of Search .............................. 222/454, 456, 222/129; 141/322

[56] References Cited

U.S. PATENT DOCUMENTS

| | | |
|---|---|---|
| 570,759 | 11/1896 | Law. |
| 856,543 | 6/1907 | Nolan. |
| 1,199,507 | 9/1916 | Strauss. |
| 1,555,591 | 9/1925 | Larrison. |
| 1,671,542 | 5/1928 | Perks. |
| 2,162,068 | 6/1939 | Duell et al.. |
| 2,204,104 | 6/1940 | Masters. |
| 2,370,820 | 3/1945 | Stott. |
| 2,803,270 | 8/1957 | Carbone, Jr. ........................ 141/322 |
| 3,396,875 | 8/1968 | Finch. |
| 4,860,927 | 8/1989 | Grindle ............................ 222/454 X |
| 4,893,732 | 1/1990 | Jennings. |
| 4,951,839 | 8/1990 | Kong .............................. 222/454 X |
| 5,054,660 | 10/1991 | Sherman et al. ...................... 222/454 |
| 5,292,039 | 3/1994 | Neofitou ........................... 222/454 X |
| 5,556,011 | 9/1996 | Jennings et al. ...................... 222/455 |

FOREIGN PATENT DOCUMENTS

| | | |
|---|---|---|
| 1397362 | 3/1965 | France. |
| 370052 | 2/1923 | Germany. |

*Primary Examiner*—Gregory L. Huson
*Attorney, Agent, or Firm*—MacMillan, Sobanski & Todd

[57] ABSTRACT

This invention relates to a container including a plastic bottle having a built in dispensing receptacle inserted into the top of the bottle, and a transfer duct for filling the dispensing receptacle. The transfer duct is separated from the main body of the container by a baffle, and the transfer duct can form a part of the handle of the container. The dispensing receptacle is filled by tipping the container with the transfer duct on the bottom. When the container is turned upright, the excess fluid not contained in the dispensing receptacle will drain back down the transfer duct. To dispense fluid, the closure is removed, container is held by the handle and tipped, and the fluid is poured from the dispensing receptacle, while the baffle prevents additional fluid from being dispensed.

26 Claims, 7 Drawing Sheets

CONTROLLED DOSE DISPENSING CONTAINER HAVING A DISPENSING RECEPTACLE FOR DISPENSING FLUIDS

BACKGROUND OF THE INVENTION

This invention relates in general to containers for dispensing fluids, such as liquids or powders. More particularly, this invention pertains to containers having systems to enable a controlled amount or dose of fluid to be dispensed from containers.

Containers for dispensing consumer fluids, such as containers for dispensing liquid detergents, detergent powders, bleach, medicine, motor oil, and insecticides, are well known. Such containers are typically blow molded from plastic material such as polypropylene or polytheylene, although metal and glass containers are also common. These containers are typically made by the bottle manufacturer at a production rate of about 100 bottles per minute, and are filled with the fluid by the product manufacturer at a rate approaching 300 per minute.

One frequently used enhancement in fluid dispensing containers is for the container to be provided with a measuring device to enable the user to dispense a controlled dose of the fluid from the container. An example of a typical measuring device for dispensing fluids is a large cap for a liquid detergent bottle, where the cap is hollow or concave in construction and is adapted to be used upside-down as a measuring cup so that the consumer can pour out or measure a controlled dose or predetermined amount of liquid detergent. Sometimes the container is adapted with a moat and drainback hole so that residual fluid dripping from the interior of the cap can drain back into the container rather than down the outside of the container after the dose has been dispensed and the cap has been returned to the top of the container.

Industrial manufacturers of consumer fluids typically market the consumer fluids in containers of different sizes. For example, liquid detergent may be packaged in 32, 48, 64 and 128 ounce sizes. In each case the amount of liquid detergent to be dispensed may be the same, for example, 2 ounces. In the case where the cap or closure is used to measure out the liquid, the volume of the closure would be 2 ounces.

The use of the cap or closure to measure out a controlled dose of fluid is not always acceptable. Using the closure as the measuring receptacle means that the residual fluid can sometimes drip around the outside of the container unless the container is adapted with a moat to catch excess fluid. Also, the consumer runs the risk that some of the fluid will contact the human skin, which would be undesirable, especially where the fluid to be dispensed is corrosive or toxic, such as, for example, a granular pesticide. It would be advantageous to be able to provide a container for fluids which would enable the dispensing of a controlled dose of the fluid, particularly in a manner in which the consumer does not have to use the closure as the measuring device. Any such system would preferably be designed to minimize the number of processing steps so that the container manufacturer or the product manufacturer can operate as efficiently as possible.

SUMMARY OF THE INVENTION

There has now been developed a container for dispensing fluids which incorporates a measuring cup or dispensing receptacle within a bottle, and which enables the consumer to pour out a measured amount or controlled dose of fluid without using an external measuring device. The container of the invention comprises a bottle having a bottle opening, a dispensing receptacle positioned within the bottle opening, and a fluid transfer system for filling the dispensing receptacle in the bottle with fluid from the bottle. With the cap or closure removed, the tipping of the bottle causes fluid in the dispensing receptacle to be dispensed, thereby enabling a controlled dose of the fluid to be dispensed. The dispensing receptacle is easily insertable into the bottle opening to enable any one of a plurality of dispensing receptacles of different volumes to be assembled within the bottle. An advantage of the invention is that it enables a manufacturer to supply different sizes (i.e., different measures or dosages) of receptacles for different customer requirements while still using standard bottle sizes. The invention enables the use of dispensing receptacles which can have a standard diameter, but which still fit bottles of various capacities as long as the bottles have the same opening size. The container of the invention has an easily blow-moldable bottle, and a standard cap or closure can be used for all of the containers.

In a specific embodiment of the invention, the dispensing receptacle is insertable into the bottle opening with a snap fit. The dispensing receptacle preferably has a flange larger than the bottle opening for positively seating the dispensing receptacle in the bottle opening.

The fluid transfer system for filling the dispensing receptacle can comprise a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed. The baffle is preferably molded into the bottle, but can be inserted or positioned within the bottle in any other suitable manner.

The bottle can have a handle and the baffle can define a transfer duct in the handle of bottle. The baffle can be integral with the handle of bottle. The container of the invention can include a concave closure which cooperates with the dispensing receptacle to enable the dispensing receptacle to be filled with fluid from the bottle when the bottle is tipped in a first direction.

In yet another embodiment of the invention, the dispensing receptacle is initially attached to the closure prior to insertion into the bottle opening so that the dispensing receptacle and the closure can be added to the bottle in a single step. This will improve the economy of the manufacturing and filling process by eliminating one step.

According to this invention, there is also provided a container assembly system which includes a plurality of bottles for dispensing fluids and a plurality of dispensing receptacles each having a predetermined volume, each container comprising a bottle and a dispensing receptacle, each bottle having a bottle opening, where tipping of the bottle, in the absence of a closure, causes fluid in the dispensing receptacle to be dispensed, thereby enabling a controlled dose of the fluid to be dispensed. The dispensing receptacles are preferably of a predetermined first diameter or size, the bottle openings are of a predetermined second diameter or size larger than the first diameter for receiving one of the dispensing receptacles. Any one of the plurality of dispensing receptacles is easily insertable into the bottle openings to enable any one of the plurality of dispensing receptacles to be assembled within any one of the plurality of bottles.

In yet another embodiment of the invention, there is provided a container assembly system where each dispensing receptacle has one of several predetermined volumes, where any one of the plurality of dispensing receptacles is easily insertable into the bottle openings to enable any one of the plurality of dispensing receptacles of different volumes to be assembled within any one of the plurality of bottles. The container assembly system of the invention enables a bottle manufacturer or the customer (product manufacturer) to interchange bottles and dispensing receptacles to provide a great variety of combinations without the expenditures of up to $250,000 for each of several high speed production molds. With the invention, the bottle manufacturer can manufacture and sell stock containers (bottles) to numerous customers, and the customers or the bottle manufacturer can insert any one of numerous dispensing receptacles.

Various objects and advantages oft his invention will become apparent to those skilled in the art from the following detailed description of the preferred embodiment, when read in light of the accompanying drawings.

DETAILED DESCRIPTION OF THE PREFERRED EMBODIMENT

Figure 1:
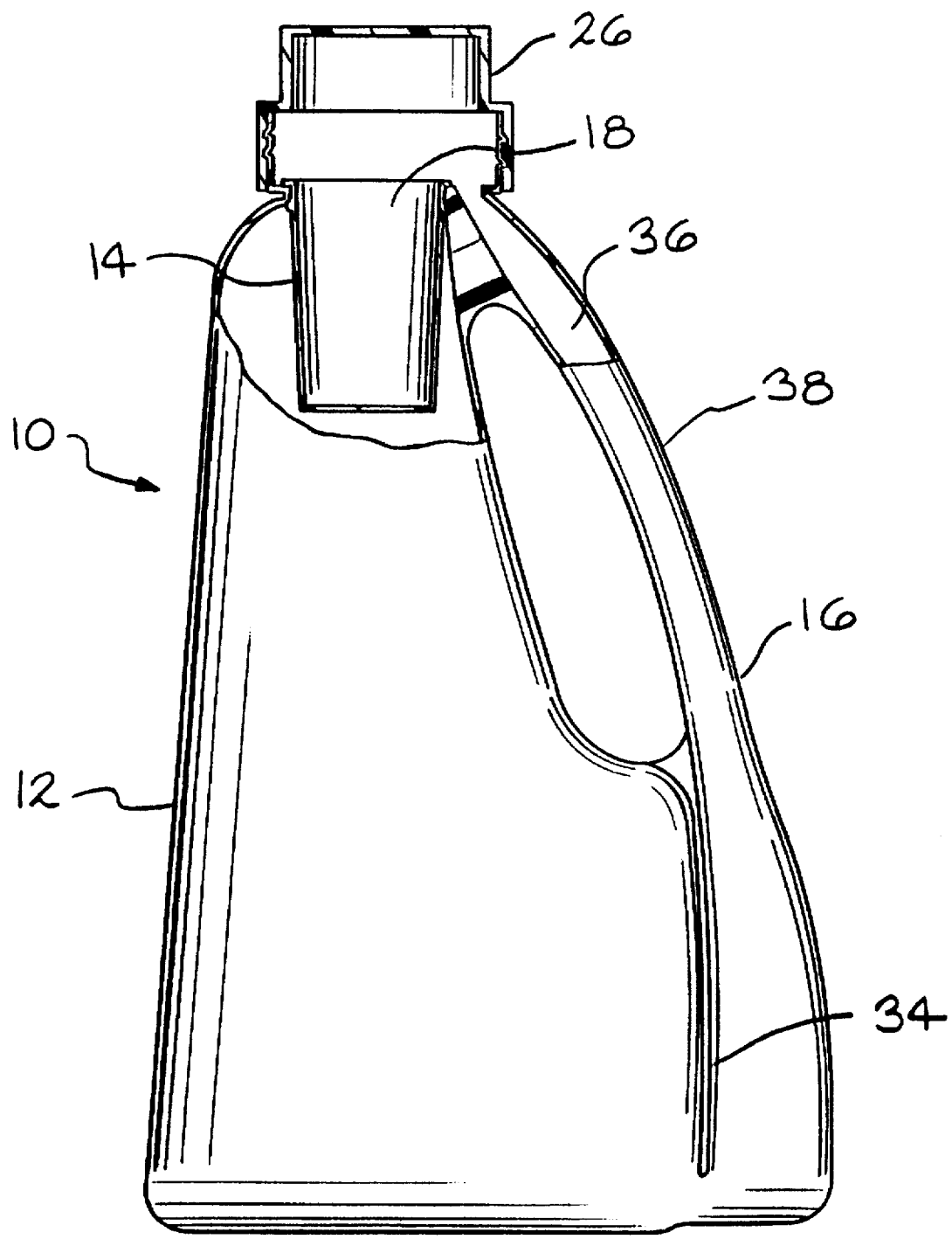
FIG. 1 is a schematic view in elevation, partially cut away, of a container of the invention.

Referring now to the drawings, there is illustrated in FIG. 1 the container 10 which is comprised of the bottle 12, dispensing receptacle 14 and fluid transfer system 16. The bottle can be my suitable container for holding fluids, and is preferably made of a blow molded plastic material, such as polypropylene, PET, or polyethylene, and can be of a single construction or multilayer plastic. Methods of manufacture of plastic bottles are well known in the art. Any type of fluid can be stored and dispensed from the container of the invention, including, but not limited to liquid detergents, detergent powders, granular pesticides, bleach, medicine, motor oil, and liquid or granular insecticides.

Figure 2:
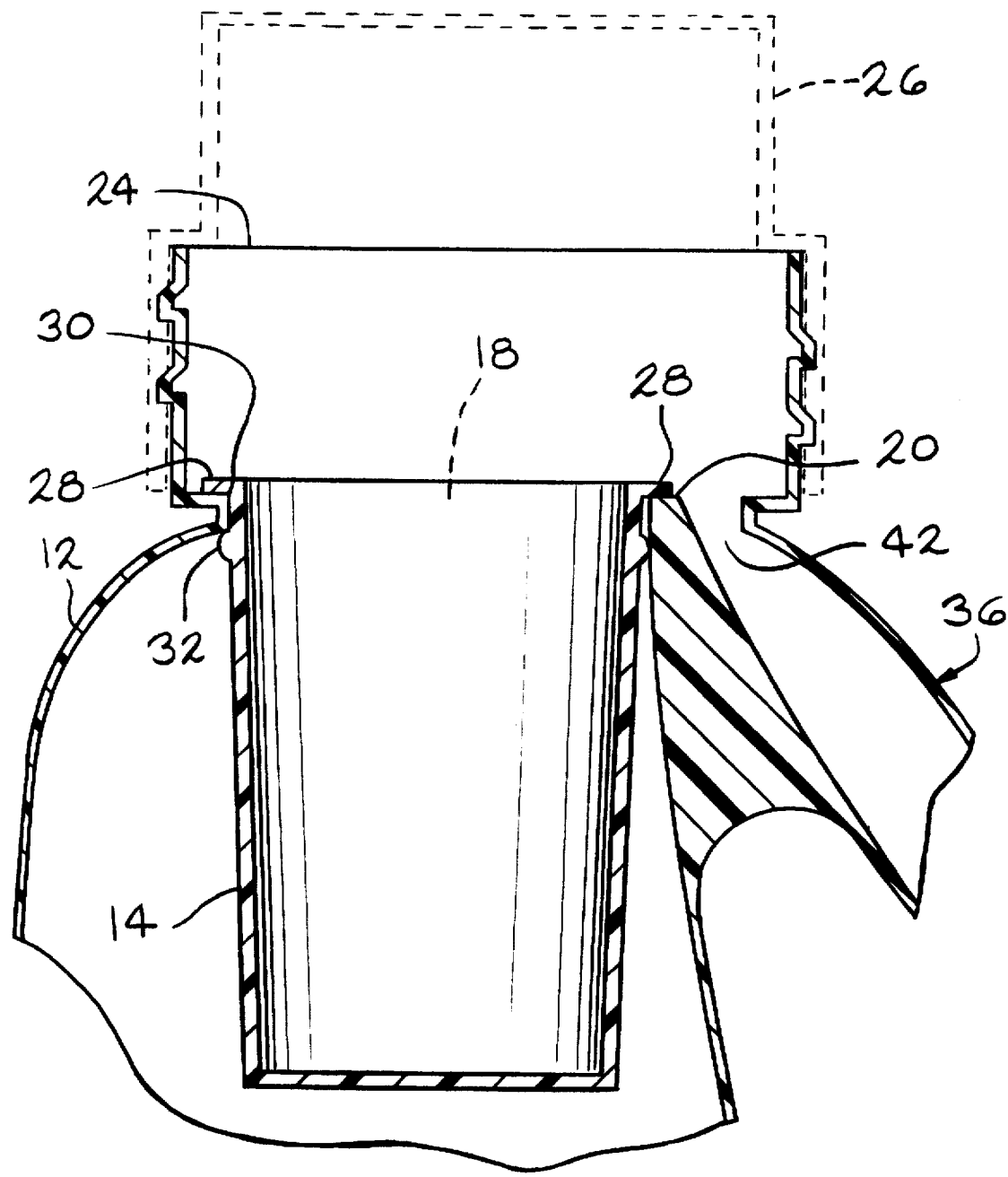
FIG. 2 is a schematic in elevation of the dispensing receptacle of the invention.

The bottle is provided with an opening 18 defined by the bottle rim 20, as more clearly seen in FIG. 2. Above the bottle opening is the bottle top 24 which is preferably threaded to receive the threaded cap or closure 26. Other means for attaching the closure to the bottle can be used. FIG. 2 illustrates the container of the invention with the closure shown removed, but in phantom lines. The closure can be any closure suitable for the intended use of the container, including one-piece closures or two-piece closures, and including stock, off-the-shelf closures.

The dispensing receptacle is concave or cup-shaped to hold the fluid to be dispensed. The dispensing receptacle can be of any shape, such as generally cylindrical, oval or triangular, and has a predetermined volume to hold and dispense a predetermined amount of fluid. The dispensing receptacle has a diameter or size slightly smaller than the diameter or size of the bottle opening to enable the dispensing receptacle to be easily inserted into the bottle. The dispensing receptacle preferably has a flange 28 at its top rim so that the dispensing receptacle will be positively seated in the bottle opening and will not fall through the bottle opening into the bottle.

The dispensing receptacle can be held in place in the bottle opening 18 by any suitable means. One such means is by providing an inwardly oriented, generally annular protrusion 30 as part of the bottle opening rim 20 or positioned just below the bottle opening dim. An annular retainer ridge 32 or other suitable means can be provided on the dispensing receptacle to secure the rim protrusion 30 in place. Suitable alternatives for the annular retainer ridge would include other types of protrusions, bumps or hubs, not shown. Preferably the diameter of the annular retainer ridge 32 is slightly greater than the diameter of the annular rim protrusion. During insertion of the dispensing receptacle 14 into the bottle, the bottle opening 18 is stretched slightly so that the annular retainer ridge 32 can be pushed below the annular rim protrusion 30, thereby forming a snap fit. A snap fit is one in which two parts are closely fitting, and with a small mount of force one part can be forced into a closely fitting relationship and held there in place. The retainer ridge holds the dispensing receptacle in place. The insertion of the dispensing receptacle is relatively easy using the snap fit.

Other means to easily attach the dispensing receptacle to the bottle can be used. These methods can include spin welding, sonic welding and adhesives, all of which are well known in the manufacture of plastic containers. All of these methods enable the assembler of the container to easily insert the dispensing receptacle into the bottle and attach the dispensing receptacle to the bottle. This is in contrast to a blow molding process in which the dispensing receptacle is created during the molding process, and is not inserted. Once the dispensing receptacle has been inserted and attached to the bottle, it can be seen that as long as there is no closure on top of the bottle, tipping the bottle will result in emptying the contents of the dispensing receptacle without having the dispensing receptacle fall out of the bottle In a particular embodiment of the invention, the insertion of the dispensing receptacle and the application of the closure to the bottle is carried out in one step rather than in two steps, thereby providing a manufacturing efficiency. This can be accomplished by temporarily attaching the dispensing receptacle to the closure and applying the closure and dispensing receptacle to the bottle as a unit, either by hand or with an automated device. The temporary attachment of the dispensing receptacle to the closure can be accomplished by any suitable means, such as with a spin weld or an adhesive, or with a simple wedge fit in which one of the two parts is wedged into attachment with the other. By firmly attaching the closure to the top 24 of the bottle, the dispensing receptacle will be forced down onto the bottle opening 18, where the firm connection between the dispensing receptacle and the bottle can be effected, either by a snap fit, adhesive, or any other suitable means. The advantage of using the dispensing receptacle attached to the closure is that the bottle filling process will have no additional step, and the bottle filling machine will not be slowed down.

The fluid transfer system provides a means for supplying or transferring fluid from the bottle 12 to the dispensing receptacle 14. One embodiment of the fluid transfer system includes a baffle, such as baffle 34, which can be used in conjunction with tipping of the container to fill the dispensing receptacle with the fluid. The baffle can be any member suitable for directing the flow of fluid to the dispensing receptacle when the container is tipped in one direction while preventing the fluid from flowing into the dispensing receptacle, or flowing out of the container, while the container is tipped the other way. Preferably, the baffle defines a passageway, such as transfer duct 36, through which the fluid can flow from bottle to the dispensing receptacle. As shown, the transfer duct forms part of the handle 38 of the container, although this is not required. In this case, the baffle is integral with the handle. The baffle and the transfer duct act in a manner similar to a one-way valve in the respect that the when the container is tipped in the first direction fluid can flow freely through the transfer duct to fill the dispensing receptacle, and when the container is tipped in the second direction fluid can flow from the dispensing receptacle, but no fluid can flow from the bottle through the transfer duct.

Figure 3:
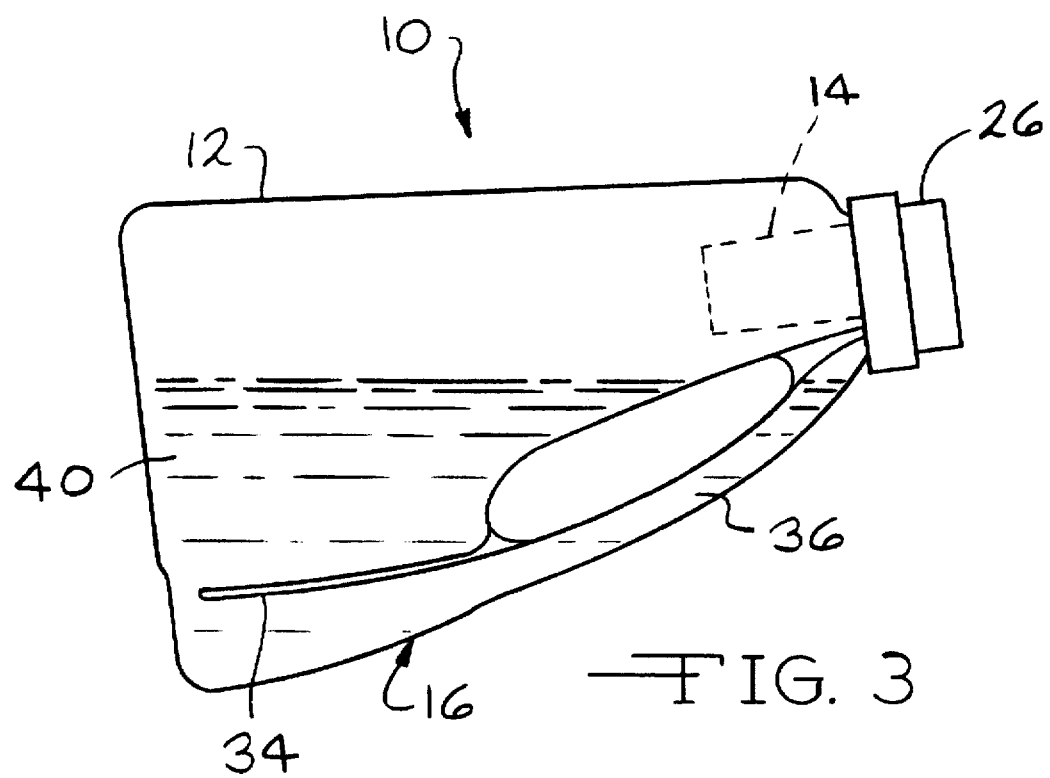
FIGS. 3-5 illustrate schematically how the bottle can be tipped in a first direction to fill the dispensing receptacle.
Figure 4:
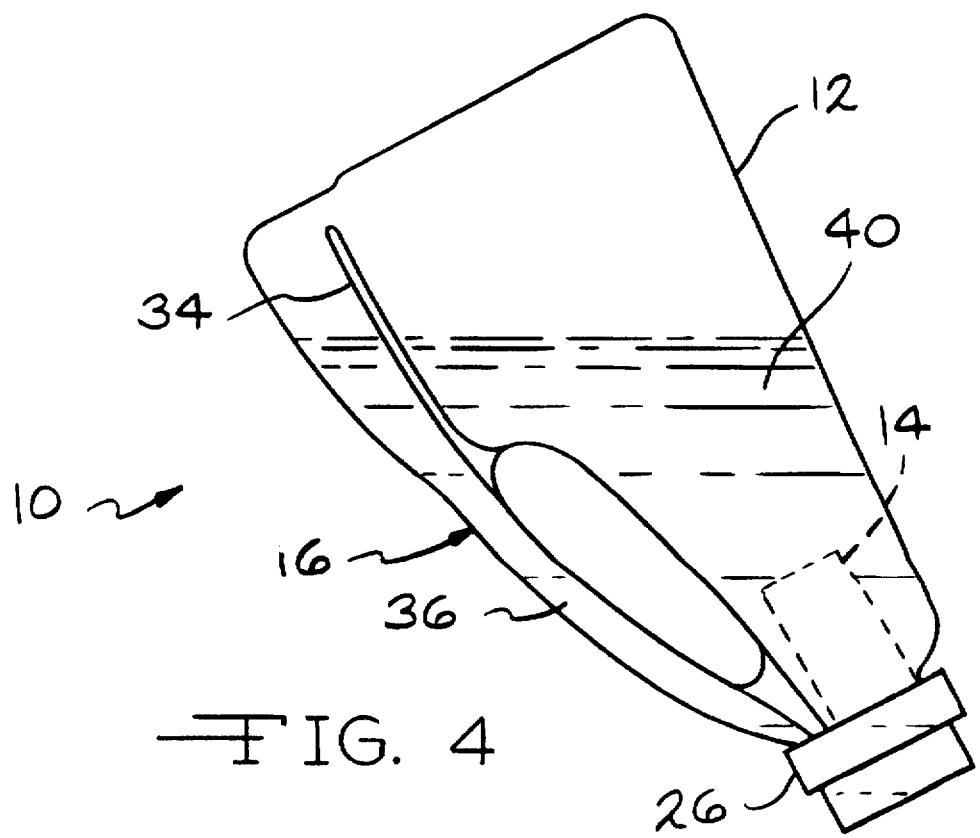
Figure 5:
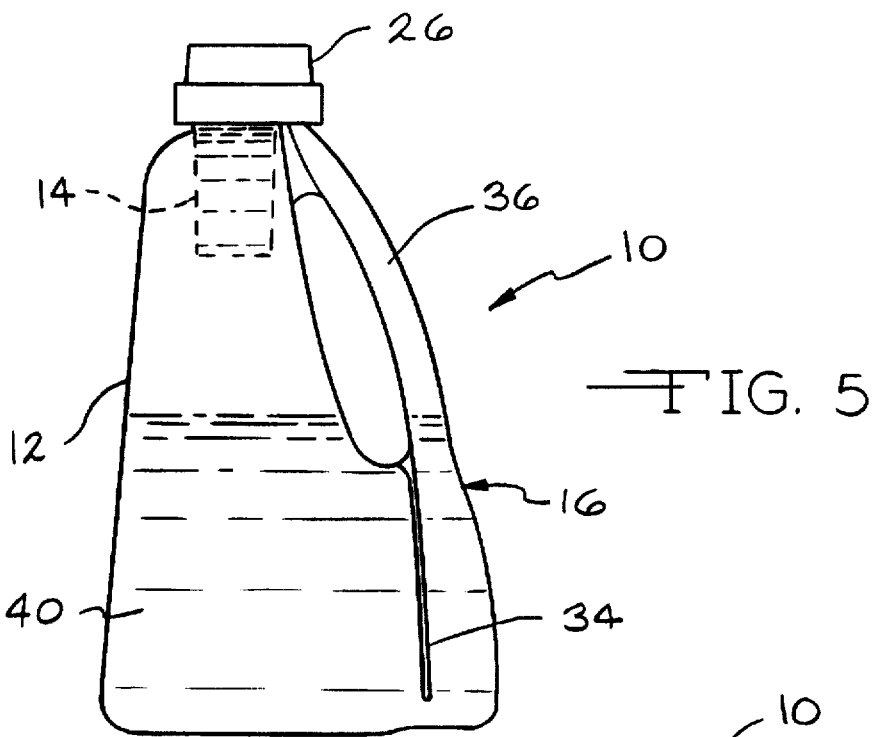

As can be seen more clearly by referring to FIGS. 3–5, the tipping of the container in a first direction serves to fill up the dispensing receptacle with the fluid 40. As shown in FIG. 3, tipping or rotating the container in the first direction, so that the handle 38 is on the bottom, fills the transfer duct with fluid. Further tipping of the container in the first direction causes the fluid to pass through the transfer duct outlet 42, and into the hollow closure 26, as shown in FIG. 4. The hollow closure becomes at least partially full with the fluid. For best results, the volume of the hollow closure is greater than the volume of the dispensing receptacle. Finally, as shown in FIG. 5, when the container is returned to its upright position, the fluid in the closure flows down into the dispensing receptacle and the excess fluid exceeding the volume of the dispensing receptacle flows back down the transfer duct 36.

Figure 6:
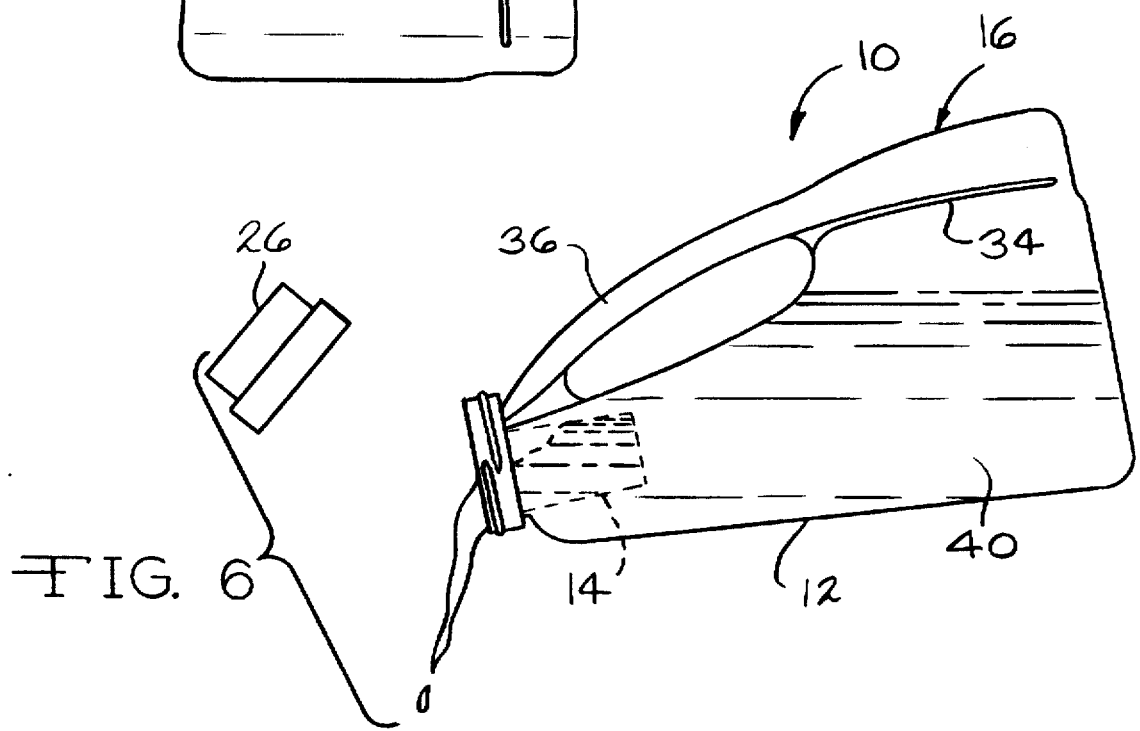
FIG. 6 illustrates schematically how the bottle can be tipped in a second direction to pour out the contents of the dispensing receptacle.

Once the dispensing receptacle has been filled, the consumer can pour the measured dose from the container by tipping the container in a second direction, as shown in FIG. 6. When the container 10 is equipped with a handle 38, as shown in the drawings, holding the container by the handle and tipping in the second direction will pour out the contents of the dispensing receptacle. Because of the baffle, tipping the container in the second direction will not result in any of the contents of the bottle being poured out.

Figure 7:
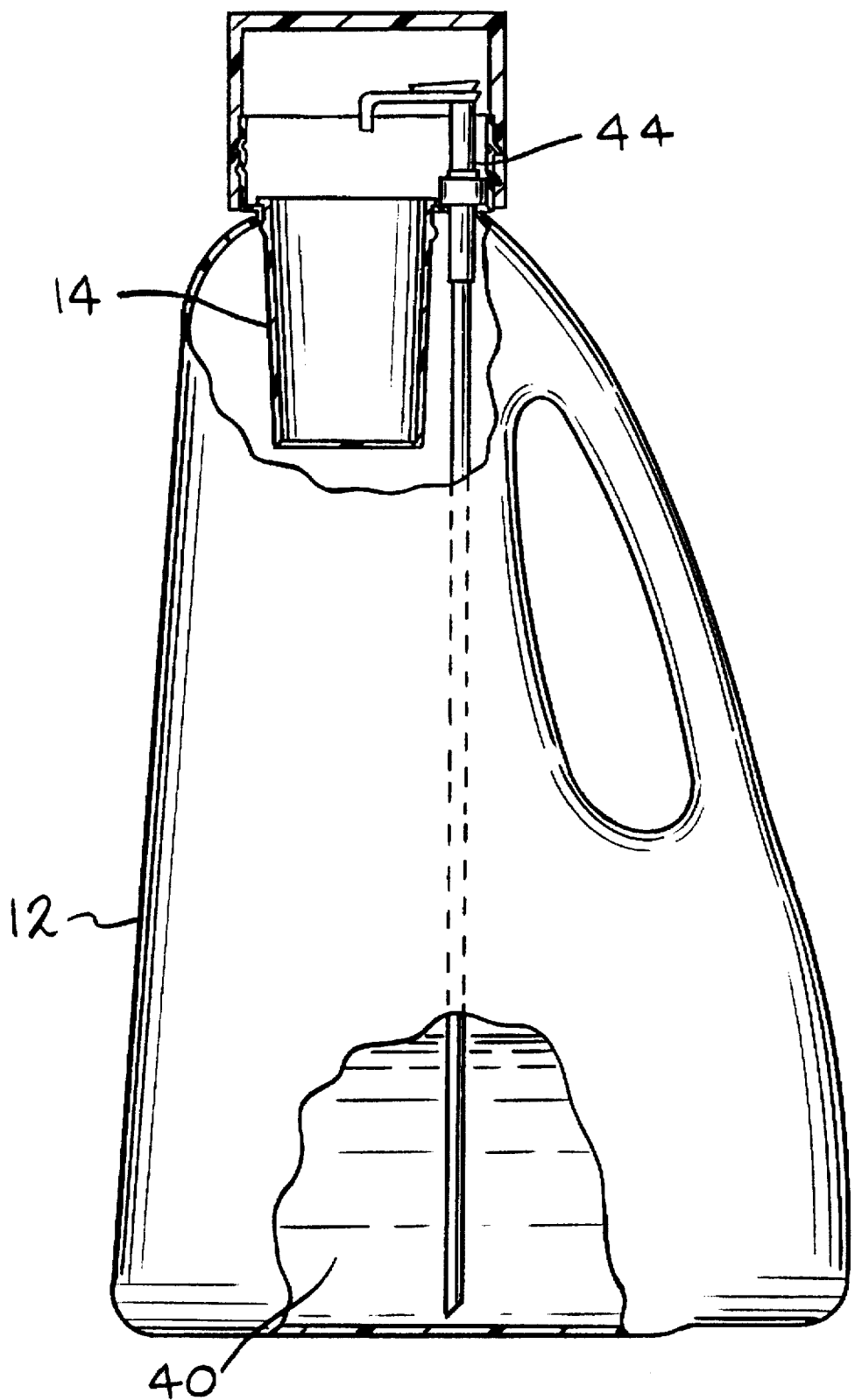
FIG. 7 is a schematic view in elevation of a container of the invention having a pump for filling the dispensing receptacle.

Although the fluid transfer system 16 illustrated in FIGS. 1–6 is shown as a hollow fluid transfer duct 36 which operates in conjunction with a baffle 34, it is to be understood that the fluid transfer system can be of different designs. For example, the fluid transfer system can be part of the bottle rather than being positioned in the handle. The important feature of the fluid transfer system is the ability to deliver fluid from the bottle to the dispensing receptacle. An alternative fluid transfer system is shown in FIG. 7, where pump 44 can be used to transfer fluid from the bottle to the dispensing receptacle.

Figure 8:
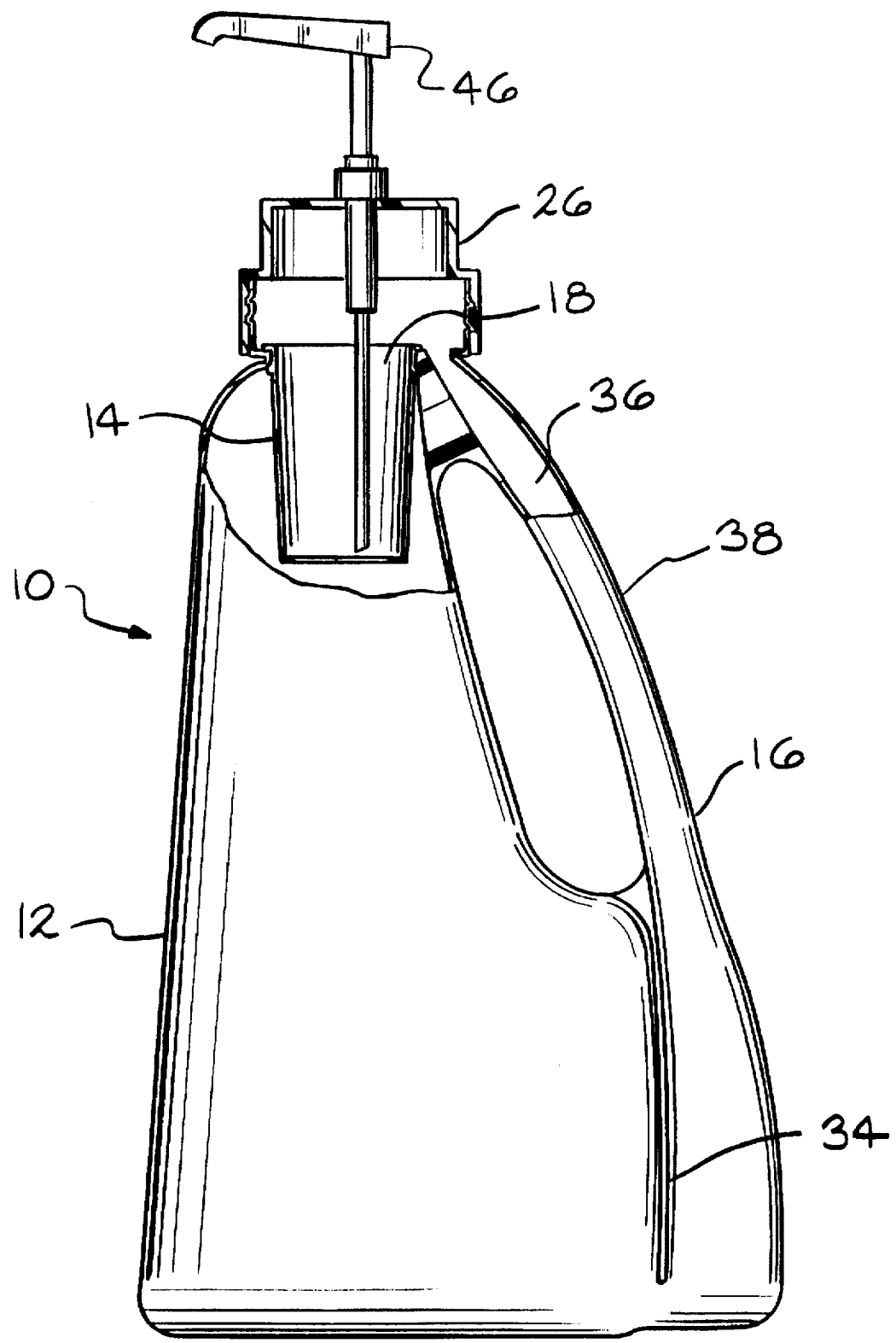
FIG. 8 is a schematic view in elevation of a container of the invention having a pump for dispensing fluid from the dispensing receptacle.

As shown in FIG. 8, the fluid can be dispensed from the dispensing receptacle by means of a pump 46 instead of by the pouring method illustrated in the other figures. In such a case, the pump is mounted through the closure 26, and extends down to the bottom of the dispensing receptacle to dispense the fluid. The pump can be any suitable device for emptying the contents of the dispensing receptacle. This design enables a controlled dose of the fluid to be dispensed without requiring the closure to be removed. This design is highly advantageous for dispensing controlled doses of such materials as insecticides or caustic materials, where human contact with the fluid should be avoided.

Figure 9:
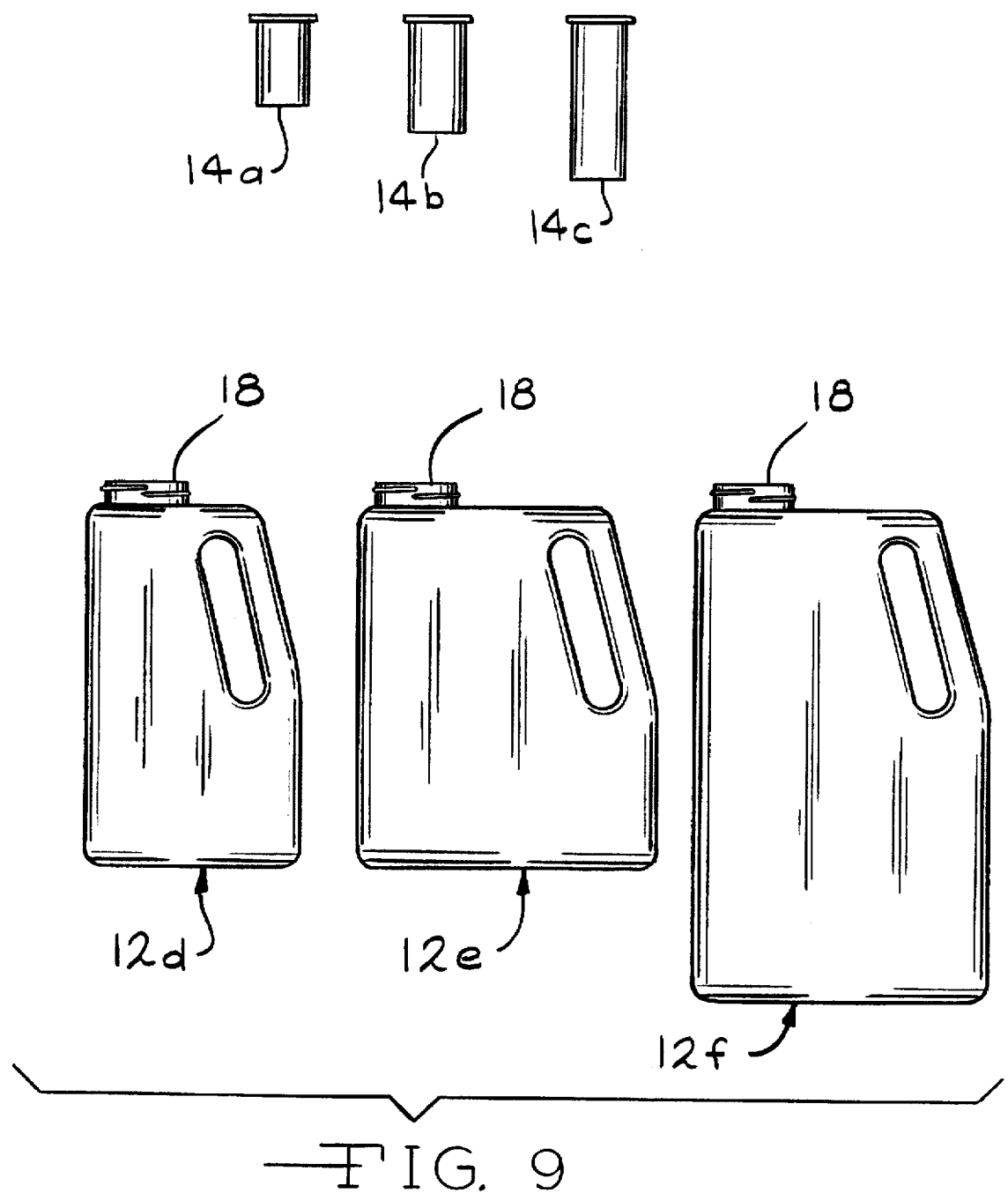
FIG. 9 shows a plurality of differing sized bottles and a plurality of differing sized receptacles interchangeably insertable therein.

It can be easily seen that by using the container assembly system of the invention numerous advantages for the bottle manufacturer can be realized. A series of containers of the invention comprised of different sized bottles, each container having the same sized bottle opening and closure, can be supplied with a series of easily insertable dispensing receptacles, all of the same size, or of different sizes, each being compatible with any of the bottle sizes, thereby allowing various customers to use the bottle size of choice with the receptacle size of choice. For example, a bottle manufacturer for liquid fabric softener bottles may manufacture bottles of four different volumes for a particular customer, with each bottle having a uniform bottle opening, and each bottle adapted to accept a uniform closure. Since the liquid fabric softener fluid to be dispensed is the same for all the bottles, a uniform dose is required. A dispensing receptacle of the predetermined volume is selected, and these dispensing receptacles are inserted into the bottles of all four sizes. It can be seen that any one of the plurality of dispensing receptacles is easily insertable into the bottle openings to enable any one of the plurality of dispensing receptacles to be assembled within any one of the plurality of bottles. It is also possible to have a container assembly system in which any one of the plurality of dispensing receptacles is insertable into the bottle openings to enable any one of the plurality of dispensing receptacles of different volumes to be assembled within any one of the plurality of bottles. The invention including a plurality of different sized receptacles insertable into any one of a plurality of different sized bottles as described above, is illustrated in FIG. 9 where a plurality of different sized receptacles 14a, 14b and 14c are shown in conjunction with a plurality of different sized bottles 12d, 12e and 12f. As described above, any one of the receptacles 14a, 14b and 14c can be inserted into the openings 18 of any one of the bottles 12d, 12e or 12f.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A container for dispensing fluids comprising a bottle having a bottle opening, a dispensing receptacle positioned within the bottle opening, and a fluid transfer system for filling the dispensing receptacle in the bottle with fluid from the bottle, where the fluid transfer system comprises a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the tipping of the bottle, in the absence of a closure, causes fluid in the dispensing receptacle to be dispensed, thereby enabling a controlled dose of the fluid to be dispensed.

2. The container of claim 1 in which the dispensing receptacle is insertable into the bottle opening with a snap fit.

3. The container of claim 1 in which the dispensing receptacle has a flange larger than the bottle opening for positively seating the dispensing receptacle in the bottle opening.

4. The container of claim 1 in which the baffle is integrally molded into the bottle.

5. The container of claim 1 in combination with a concave closure which cooperates with the dispensing receptacle to enable the dispensing receptacle to be filled with fluid from the bottle when the bottle is tipped in a first direction.

6. The container of claim 1 in which the baffle defines a transfer duct which enables the dispensing receptacle to be filled with fluid from the bottle.

7. The container of claim 6 in which the bottle has a handle and in which the transfer duct is in the handle of bottle.

8. The container of claim 7 in which the baffle is integral with the handle of bottle.

9. The container of claim 1 in which the fluid transfer system comprises a baffle positioned within the bottle to define a transfer duct which enables the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the dispensing receptacle is insertable into the bottle opening with a snap fit.

10. The container of claim 9 in which the dispensing receptacle has a flange larger than the bottle opening for positively seating the dispensing receptacle in the bottle opening, and in which the bottle has a handle, where the transfer duct is in handle of bottle.

11. The container of claim 10 in combination with a concave closure which cooperates with the dispensing receptacle to enable the dispensing receptacle to be filled with fluid from the bottle when the bottle is tipped in a first direction.

12. A container assembly system for containers for dispensing fluids comprising a plurality of bottles for dispensing fluids and a plurality of dispensing receptacles each having a predetermined different volume, each container comprising a bottle and a dispensing receptacle, each bottle having a bottle opening, where tipping of the bottle, in the absence of a closure, causes fluid in the dispensing receptacle to be dispensed, thereby enabling a controlled dose of the fluid to be dispensed, the dispensing receptacles being of a predetermined first diameter, the bottle openings being of a predetermined second diameter larger than the first diameter for receiving one of the dispensing receptacles, and the bottles being provided with a fluid transfer system for filling the dispensing receptacles in the bottles with fluid from the bottles, where any one of the plurality of dispensing receptacles of different volumes is insertable into the bottle openings to enable any one of the plurality of dispensing receptacles to be assembled within any one of the plurality of bottles.

13. The container assembly system of claim 12 including a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the baffle is integrally molded into the bottle.

14. The container assembly system of claim 12 including a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the dispensing receptacle is insertable into the bottle opening with a snap fit.

15. The container assembly system of claim 12 including a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the bottle has a handle, and in which the baffle is integral with the handle to define a transfer duct in the handle of bottle, and further including a concave closure which cooperates with the dispensing receptacle to enable the dispensing receptacle to be filled with fluid from the bottle when the bottle is tipped.

16. A container assembly system for containers for dispensing fluids comprising a plurality of bottles for dispensing fluids and a plurality of dispensing receptacles, each container comprising a bottle and a dispensing receptacle, each bottle having a bottle opening, where tipping of the bottle, in the absence of a closure, causes fluid in the dispensing receptacle to be dispensed, thereby enabling a controlled dose of the fluid to be dispensed, each dispensing receptacle having one of several differing predetermined volumes, the dispensing receptacles being of a predetermined first diameter, the bottle openings being of a predetermined second diameter larger than the first diameter for receiving one of the dispensing receptacles, and the bottles being provided with a fluid transfer system for filling the dispensing receptacles in the bottles with fluid from the bottles, where any one of the plurality of dispensing receptacles is insertable into the bottle openings to enable any one of the plurality of dispensing receptacles of different volumes to be assembled within any one of the plurality of bottles.

17. The container assembly system of claim 16 in which the dispensing receptacle is insertable into the bottle opening with a snap fit.

18. The container assembly system of claim 16 including a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where the bottle has a handle, and in which the baffle is integral with the handle to define a transfer duct in the handle of bottle, and further including a concave closure which cooperates with the dispensing receptacle to enable the dispensing receptacle to be filled with fluid from the bottle when the bottle is tipped.

19. A container assembly system for containers for dispensing fluids comprising a plurality of bottles for dispensing fluids and a plurality of dispensing receptacles each having a predetermined volume, each container comprising a bottle and a dispensing receptacle, each bottle having a bottle opening, where tipping of the bottle, in the absence of a closure, causes fluid in the dispensing receptacle to be dispensed, thereby enabling a controlled dose of the fluid to be dispensed, the dispensing receptacles being of a predetermined first diameter, the bottle openings being of a predetermined second diameter larger than the first diameter for receiving one of the dispensing receptacles, and the bottles being provided with a fluid transfer system for filling the dispensing receptacles in the bottles with fluid from the bottles, where the fluid transfer system comprises a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, where any one of the plurality of dispensing receptacles of different volumes is insertable into the bottle openings to enable any one of the plurality of dispensing receptacles to be assembled within any one of the plurality of bottles.

20. The container assembly system of claim 19 in which the dispensing receptacle is insertable into the bottle opening with a snap fit.

21. The container assembly system of claim 19 in which the bottle has a handle, and in which the baffle is integral with the handle to define a transfer duct in the handle of bottle, and further including a concave closure which cooperates with the dispensing receptacle to enable the dispensing receptacle to be filled with fluid from the bottle when the bottle is tipped.

22. The container assembly system of claim 19 in which the baffle is integrally molded into the bottle.

23. The container assembly system of claim 22 in which the dispensing receptacle is insertable into the bottle opening with a snap fit, and in which the bottle has a handle, and in which the baffle is integral with the handle to define a transfer duct in the handle of bottle, and farther including a concave closure which cooperates with the dispensing receptacle to enable the dispensing receptacle to be filled with fluid from the bottle when the bottle is tipped.

24. A container assembly system for containers for dispensing fluids comprising a plurality of bottles for dispensing fluids and a plurality of dispensing receptacles, each container comprising a bottle and a dispensing receptacle, each bottle having a bottle opening, where tipping of the bottle, in the absence of a closure, causes fluid in the dispensing receptacle to be dispensed, thereby enabling a controlled dose of the fluid to be dispensed, each dispensing receptacle having one of several predetermined volumes, the dispensing receptacles being of a predetermined first diameter, the bottle openings being of a predetermined second diameter larger than the first diameter for receiving one of the dispensing receptacles, and the bottles being provided with a fluid transfer system for filling the dispensing receptacles in the bottles with fluid from the bottles, where the fluid transfer system comprises a baffle positioned within the bottle to enable the dispensing receptacle to be filled with fluid from the bottle when the bottle is tipped in a first direction and to prevent fluid from the bottle from entering the receptacle when the bottle is tipped in a second, opposite direction, thereby enabling a controlled dose of the fluid to be dispensed, and where any one of the plurality of dispensing receptacles is insertable into the bottle openings to enable any one of the plurality of dispensing receptacles of different volumes to be assembled within any one of the plurality of bottles.

25. The container assembly system of claim 24 in which the dispensing receptacle is insertable into the bottle opening with a snap fit.

26. The container assembly system of claim 24 in which the bottle has a handle, and in which the baffle is integral with the handle to define a transfer duct in the handle of bottle, and further including a concave closure which cooperates with the dispensing receptacle to enable the dispensing receptacle to be filled with fluid from the bottle when the bottle is tipped.

* * * * *